US012576456B2

(12) United States Patent
GM et al.

(10) Patent No.: US 12,576,456 B2
(45) Date of Patent: Mar. 17, 2026

(54) SMART CONTROLLER FOR EXOTHERMIC WELDING AND RELATED SYSTEMS AND METHODS

(71) Applicant: TE Connectivity Solutions GmbH, Schaffhausen (CH)

(72) Inventors: Manjunath GM, Bangalore (IN); Curtis Stidham, Fuquay-Varina, NC (US); Amrutha SP, Bangalore (IN); Rachin A, Bangalore (IN); Maheshwar A Natu, Bangalore (IN); Karthik Prabhakaran, Bangalore (IN); Hemanth Kumar Pennam, Bangalore (IN)

(73) Assignee: TE Connectivity Solutions GmbH, Schaffhausen (CH)

( * ) Notice: Subject to any disclaimer, the term of this patent is extended or adjusted under 35 U.S.C. 154(b) by 557 days.

(21) Appl. No.: 18/051,153

(22) Filed: Oct. 31, 2022

(65) Prior Publication Data

US 2024/0139860 A1    May 2, 2024

(51) Int. Cl.
B23K 20/16        (2006.01)
(52) U.S. Cl.
CPC .................................. B23K 20/165 (2013.01)
(58) Field of Classification Search
CPC .................................................. B23K 20/165
USPC ......................................................... 700/65
See application file for complete search history.

(56) References Cited

U.S. PATENT DOCUMENTS

| | | | |
|---|---|---|---|
| 7,950,568 B2 | 5/2011 | Stidham et al. | |
| 9,562,751 B2 | 2/2017 | Harger et al. | |
| 10,684,012 B2 | 6/2020 | Harger et al. | |
| 10,758,997 B2 | 9/2020 | Yu et al. | |
| 2011/0198391 A1 | 8/2011 | Stidham et al. | |
| 2012/0055979 A1* | 3/2012 | Alghusain | B23K 25/00 228/198 |
| 2015/0041520 A1* | 2/2015 | Pomar Garcia | F42B 3/10 228/33 |
| 2015/0219334 A1* | 8/2015 | Harger | F23Q 7/16 431/258 |
| 2015/0328716 A1* | 11/2015 | Duart Álvarez Cienfuegos | B23K 23/00 219/267 |
| 2017/0232551 A1* | 8/2017 | Abedraboh | B23K 23/00 228/18 |
| 2024/0077971 A1* | 3/2024 | Kim | G06F 3/0441 |
| 2024/0091877 A1* | 3/2024 | Ramasamy | F23Q 3/006 |

* cited by examiner

*Primary Examiner* — Md Azad
(74) *Attorney, Agent, or Firm* — Myers Bigel, P.A.

(57) ABSTRACT

A method of controlling the ignition of exothermic weld material includes providing an exothermic welding system. The exothermic welding system includes: a controller including or connected to a battery; and a cable comprising a first end connected to a controller and a second, opposite end connected to an igniter, with a wire filament, attached to a mold holding the weld material. The method includes: receiving a wireless input signal from a portable electronic device; and in response to receiving the input signal, directing current from the battery to the second end of the cable to ignite the weld material.

18 Claims, 10 Drawing Sheets

400

400

SMART CONTROLLER FOR EXOTHERMIC WELDING AND RELATED SYSTEMS AND METHODS

BACKGROUND

Exothermic welding is used for joining connectors to each other and for joining other metal parts, such as ground rods. A reusable mold contains an internal crucible in which an exothermic weld metal powder is placed. When the exothermic weld metal powder is ignited, an exothermic reaction results in the crucible. The reaction of the weld metal powder results in molten copper alloy and the molten copper flows into a weld cavity in the mold.

The exothermic reaction process (Aluminothermic reaction) is initiated by thermal energy input into the material at a temperature at or above its reaction temperature of the weld material. A spark or ignition gun, sometimes referred to as a flint igniter, is often used to start the exothermic reaction which takes place extremely quickly once ignited. The flint igniter requires the operator to be close to the mold and therefore places the operator in close proximity to the exothermic reaction taking place.

SUMMARY

Some embodiments of the present invention are directed to a method of controlling the ignition of exothermic weld material, the method including providing an exothermic welding system. The exothermic welding system includes: a controller including or connected to a battery; and a cable including a first end connected to a controller and a second, opposite end connected to an igniter, with a wire filament, attached to a mold holding the weld material. The method includes: receiving a wireless input signal from a portable electronic device; and in response to receiving the input signal, directing current from the battery to the second end of the cable to ignite the weld material.

In some embodiments, the method further includes determining a distance between the controller and the portable electronic device. Directing current from the battery to the second end of the cable may include sending current from the battery to the second end of the cable only if the distance is equal to or greater than a predetermined distance. The predetermined distance may be 1 meter.

In some embodiments, the method further includes pairing the portable electronic device and the controller.

In some embodiments, the portable electronic device is a first portable electronic device, and the method further includes preventing a second portable electronic device from pairing with the controller while the first electronic device and the controller are paired.

In some embodiments, the method further includes unpairing the portable electronic device and the controller after a predetermined amount of time has elapsed with the controller being idle. The predetermined amount of time may be 30 minutes.

In some embodiments, pairing the portable electronic device and the controller includes scanning a quick response (QR) code on the controller using the portable electronic device.

In some embodiments, pairing the portable electronic device and the controller includes inputting a pair code using the portable electronic device.

In some embodiments, the method further includes displaying a warning and/or emitting an alert when the cable is not properly connected to the controller and/or to the mold.

In some embodiments, the method further includes, before receiving a wireless input signal from a portable electronic device, placing the controller in an ARM mode using the portable electronic device. The method may further include providing audible and/or visual feedback in response to the controller being in ARM mode.

In some embodiments, directing current from the battery to the second end of the cable includes directing current from the battery to the second end of the cable for only a predetermined amount of time. The predetermined amount of time may be 500 ms.

Some other embodiments of the present invention are directed to a controller for igniting weld material in an exothermic welding process. The controller includes: an enclosure; a battery connection feature on the enclosure configured to connect the controller to a battery; an electronic circuit in the enclosure; and a connection on the enclosure and configured to receive a first end of a cable with a second, opposite end of the cable configured to be received at a mold holding the weld material. The electronic circuit includes a processor that is configured to, responsive to receiving an input signal, direct an ignition current to flow from the battery to the second end of the cable. The electronic circuit includes a wireless module configured to receive a wireless signal from a portable electronic device as the input signal.

In some embodiments, the electronic circuit is configured to determine a distance between the portable electronic device and the controller, and to direct the ignition current to flow from the battery to the second end of the cable only if the distance is equal to or greater than a predetermined distance. The predetermined distance may be 1 meter.

In some embodiments, the electronic circuit is configured to pair the portable electronic device and the controller.

In some embodiments, the portable electronic device is a first portable electronic device, and the electronic circuit is configured to prevent a second portable electronic device from pairing with the controller while the first electronic device and the controller are paired.

In some embodiments, the electronic circuit is configured to unpair the portable electronic device and the controller after a predetermined amount of time has elapsed with the controller being idle.

In some embodiments, the controller further includes a quick response (QR) code on the enclosure, and the electronic circuit is configured to pair the portable electronic device and the controller responsive to scanning the QR code using the portable electronic device.

In some embodiments, the controller further includes a pair code on the enclosure, and the electronic circuit is configured to pair the portable electronic device and the controller responsive to inputting the pair code using the portable electronic device.

In some embodiments, the electronic circuit is configured to display a warning and/or emit an alert when the cable is not properly connected to the controller and/or the mold.

In some embodiments, the controller further includes at least one actuator on the enclosure configured to provide the input signal upon actuation thereof.

In some embodiments, the electronic circuit includes at least one switch between the battery and the connection, and the processor is configured to close the at least one switch in response to receiving the input signal. The at least one switch may include first and second switches arranged in parallel.

In some embodiments, the enclosure includes a primary body and a lid connected to the primary body with a seal therebetween. In some embodiments, the controller further includes a connection seal around the connection. In some embodiments, the controller is an IP 65 enclosure.

Some other embodiments of the present invention are directed to an exothermic welding system including: a battery; a controller configured to electrically connect to the battery; a cable comprising a first end configured to connect to a connection of the controller and a second end configured to connect to an igniter, with a wire filament, attached to a mold containing weld material. The controller is configured to, in response to receiving an input signal, direct ignition current from the battery to the cable to ignite the weld material. The input signal is selectively provided (i) as a wireless signal from a portable electronic device or (ii) in response to actuation of an actuator of the controller.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1A:
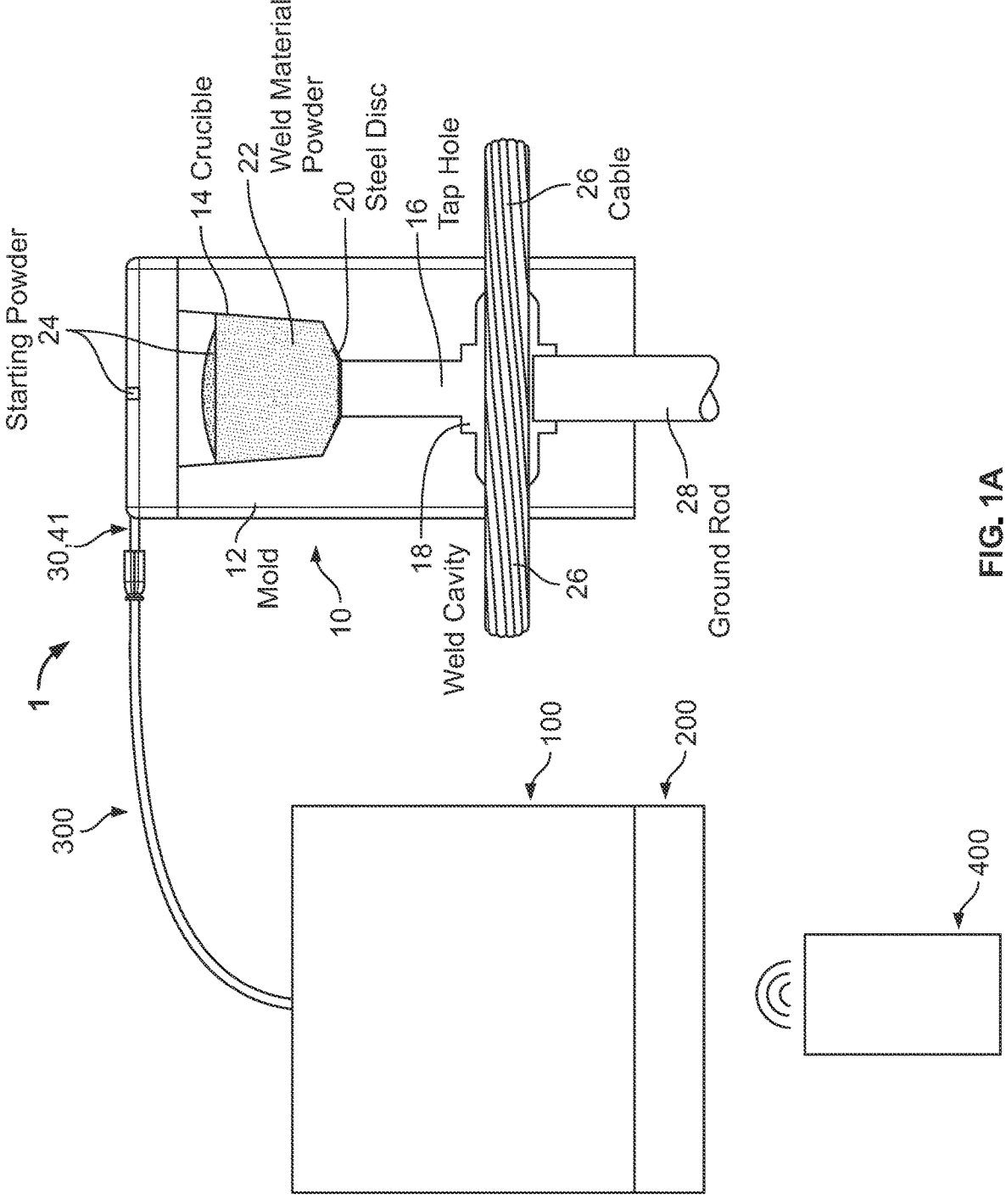
FIG. 1A is a schematic view of an exothermic welding system according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An exothermic welding system 1 is illustrated in FIG. 1A. The system 1 may include a mold 10, a controller 100, a battery 200 that is connectable to the controller 100, a cable 300 connecting the mold 10 and the controller 100, and a portable electronic device 400 such as a smartphone or tablet computer.

The mold 10 includes a mold body 12, a crucible 14 in the body 12, a tap hole 16, and a weld cavity 18. The crucible 14 is configured to hold a metal (e.g., steel) disc or disk 20, weld material 22, and a starting powder 24. The weld material 22 may be any suitable material known to those skilled in the art. In some embodiments, the weld material 22 is a (powder) mixture of copper oxide and aluminum which produces copper and aluminum oxide after an exothermic reaction takes place.

The weld cavity 18 is configured to hold conductors 26, 28. The conductor 28 may be a ground rod. As described in more detail herein, the controller 100 is configured to direct an ignition current from the battery 200 through the cable 300 and to igniter 41 engaged with the mold 10. This ignites the starting powder 24 and the weld material 22. The ignited weld material 22 reacts and results in molten copper, and heat liberation, the copper in liquid state burns through the disk 20 and drops into the tap hole 16 and the weld cavity 18, the molten copper melts and fuses together (welds) conductors 26 and 28, thereby forming an electrical connection around the two adjacent conductors 26, 28 as the weld material 22 cools.

Figure 2:
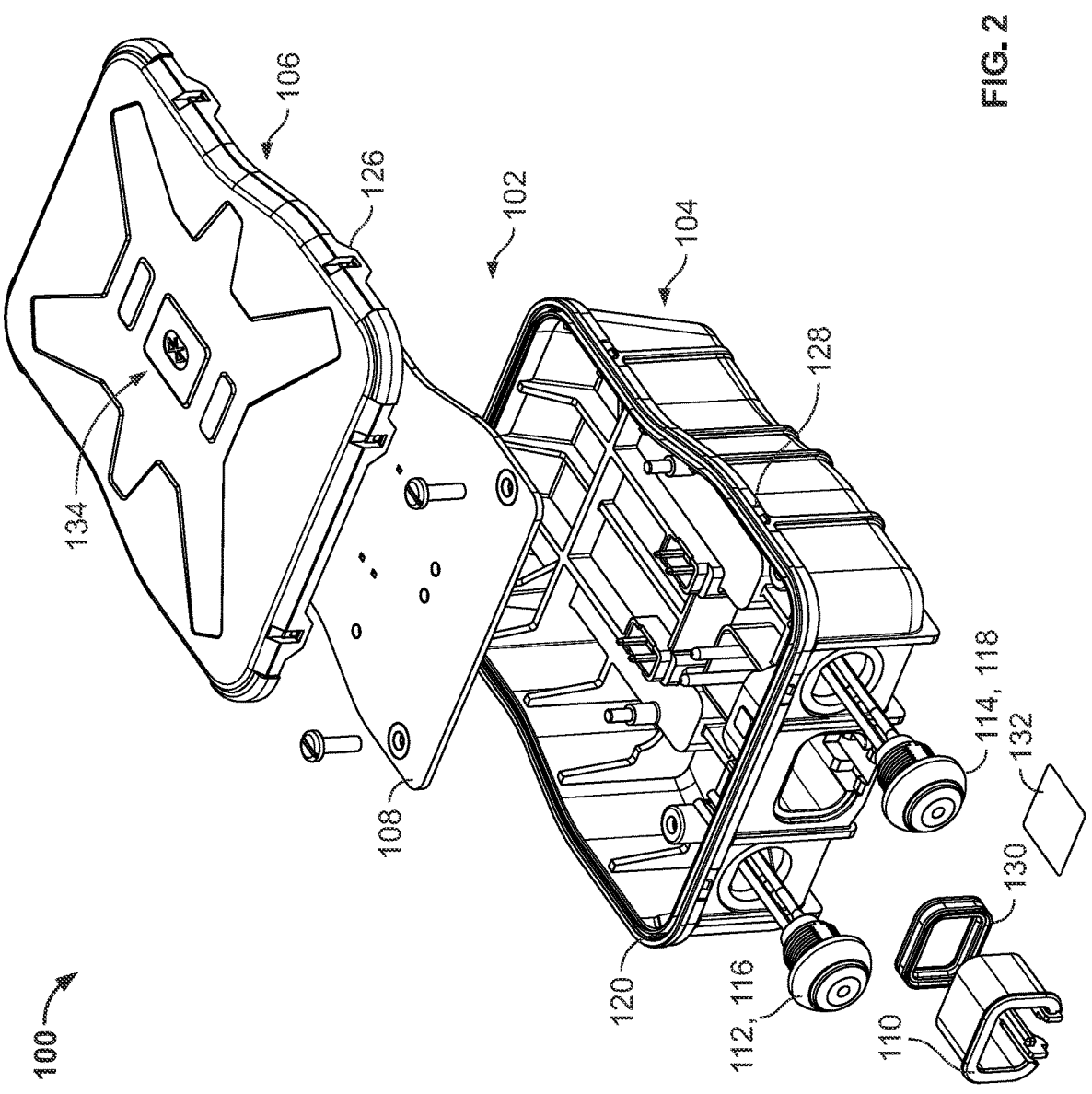
FIG. 2 is an exploded view of a controller according to some embodiments of the present invention.
Figure 3:
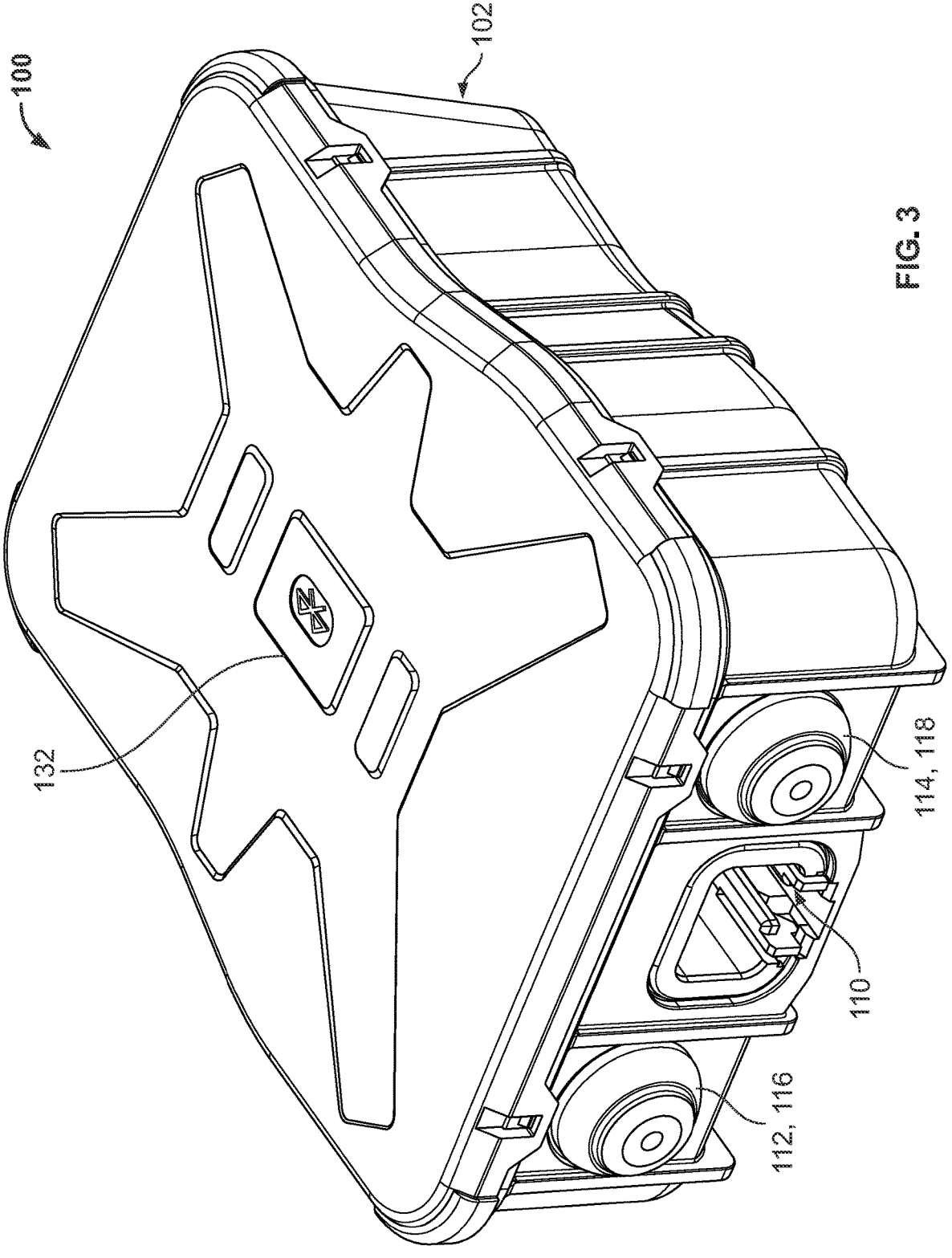
FIG. 3 is an assembled view of the controller of FIG. 2.

The controller 100 is shown in greater detail in FIGS. 2 and 3. The controller 100 includes an enclosure or housing 102. The enclosure 102 may include a primary enclosure body 104 and a cover or lid 106 configured to be connected to the body 104.

Figure 1B:
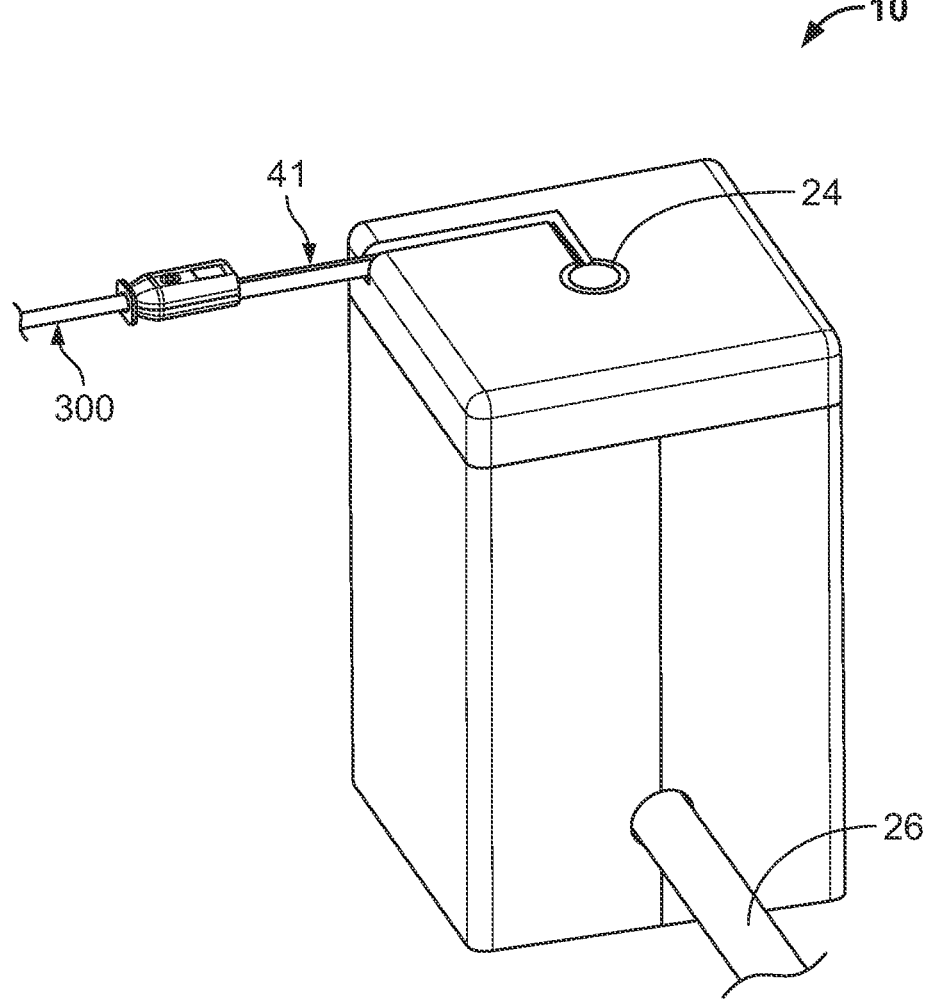
FIG. 1B is a perspective view of a mold of the system of FIG. 1.

The controller 100 may include a printed circuit board (PCB) 108 held within the enclosure 102. The controller 100 includes a connection 110 that is configured to receive one end of the cable 300 (FIG. 1) to electrically connect the cable 300 to the PCB 108.

The controller 100 may include a first actuator or switch such as a first push button 112 on the enclosure 102 and a second actuator or switch such as a second push button 114 on the enclosure 102. A first indicator such as a first light emitting diode (LED) 116 may be at, adjacent, in, or on the first button 112 and a second indicator such as a second LED 118 may be at, adjacent, in, or on the second button 114.

The first LED 116 and the second LED 118 may be configured to display different colors. For example, the first LED 116 may be a red LED and the second LED 118 may be a green LED. As described in more detail herein, the different colors may provide feedback to an operator during operation of the controller 100.

The first and second buttons 112, 114 and the first and second LEDs 116, 118 may be electrically connected to the PCB 108.

Figure 4:
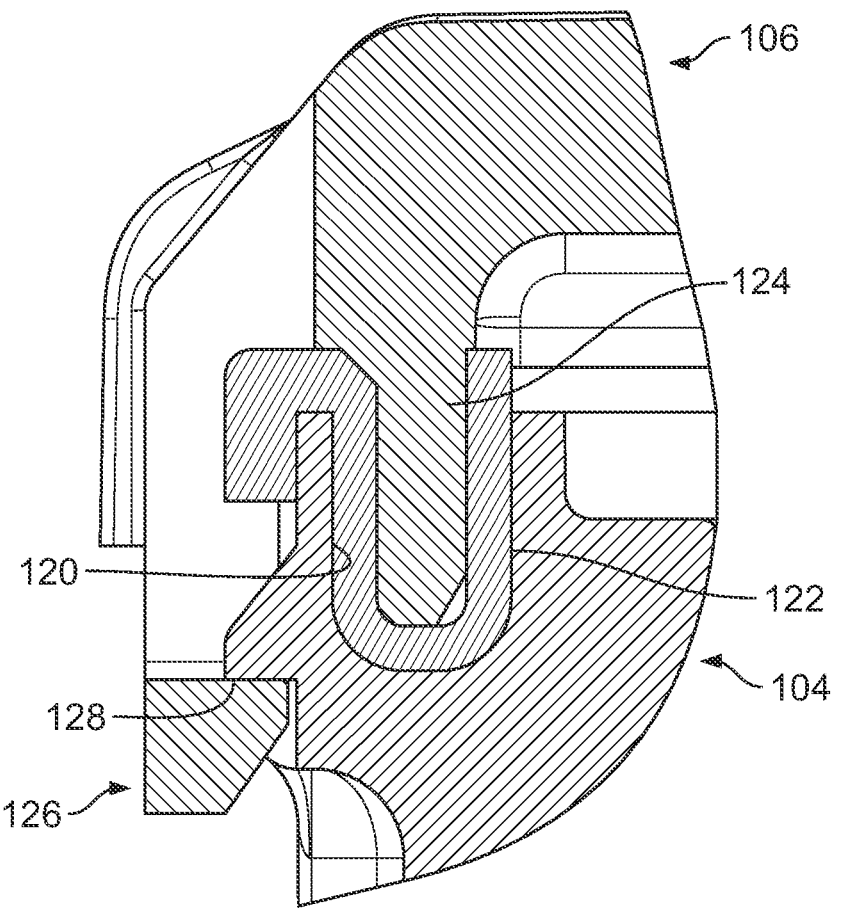
FIG. 4 is a fragmentary sectional view of the controller of FIG. 2.

The enclosure body 104 may include a channel or groove 120 configured to hold a seal and/or receive a portion of the lid 106. For example, referring to FIGS. 2 and 4, the groove 120 may receive a sealant 122. In some embodiments, the sealant 122 is room temperature vulcanizing (RTV) sealant.

The groove 120 may also receive a lip 124 of the lid 106. The lid 106 may include a plurality of latches 126 that are configured to be locked onto corresponding seats 128 of the enclosure body 104. In some embodiments, the latches 126 snap into place on the seats 128, providing audible and/or tactile feedback to the operator that the enclosure is properly assembled.

The controller 100 may include a connection seal 130 that surrounds the connection 110.

The sealant 122 and the connection seal 130 may protect against the ingress of debris or liquids. In some embodiments, the controller 100 is an IP 65 rated enclosure.

A label 132 may include a machine readable data code such as a quick response (QR) code and/or an alphanumeric code. As described in more detail below, these codes may be used to pair the controller 100 and the electronic device 400 (FIG. 1A).

Figure 5:
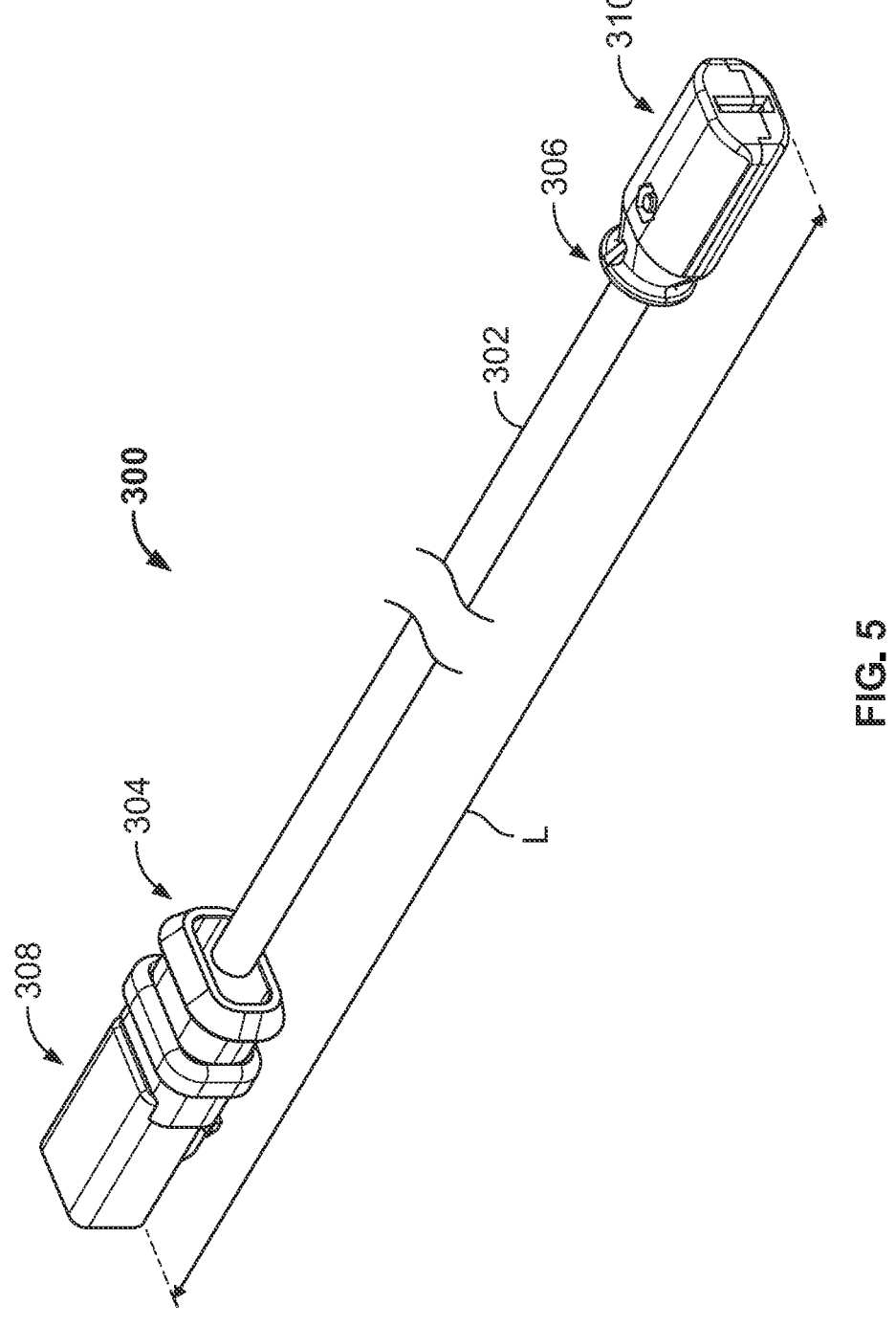
FIG. 5 is a perspective view of a cable according to some embodiments of the present invention.

The cable 300 is shown in more detail in FIG. 5. The cable 300 includes a primary cable 302 including a first or proximal end 304 and a second or distal end 306. A first connector 308 is at the first end 304 of the cable 300 and a second connector 310 is at the second end 306 of the cable 300. The first connector 308 is configured to be received in the connection 110 of the controller 100 (FIGS. 2 and 3). The second connector 310 is configured to be received in a connection 30 of the igniter 41 attached to mold 10 (FIG. 1A). With the first and second connectors 308, 310 so connected, current from the battery 200 is configured to ignite the starting powder material 24 and weld material 22.

The cable 300 may have a length L. In some embodiments, the length L is between about 6 feet and 12 feet. In some embodiments, the length L is about 6 feet.

Figure 6:
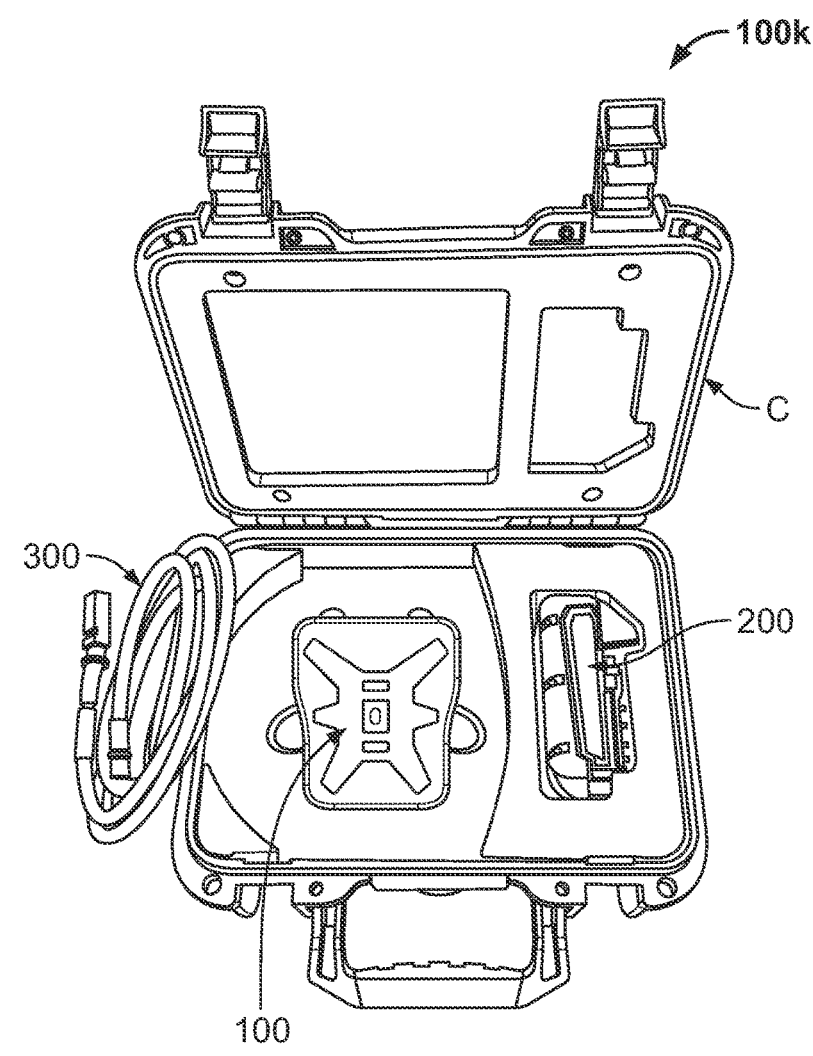
FIG. 6 is a perspective view of a controller kit according to some embodiments of the present invention.
Figure 6:
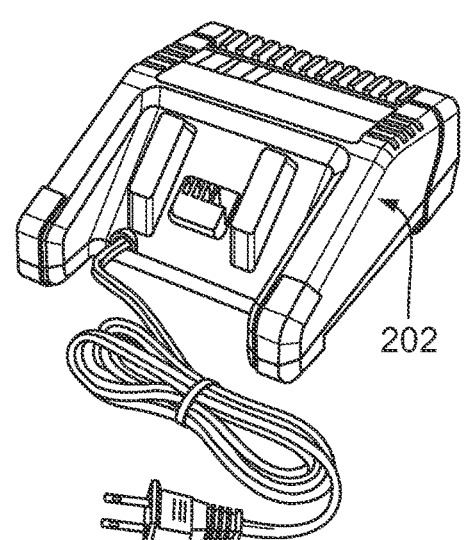

A controller kit 100k according to some embodiments is illustrated in FIG. 6. The kit 100k may include the controller 100, the battery 200, and the cable 300. In some embodiments, the kit 100k may also include a battery charger 202 configured to charge the battery 200. In some embodiments, the components of the kit 100k may be packed in a carry case C.

As described in more detail below, a weld operation may be performed manually using the controls on the controller 100 or remotely using the portable electronic device 400.

Figure 7:
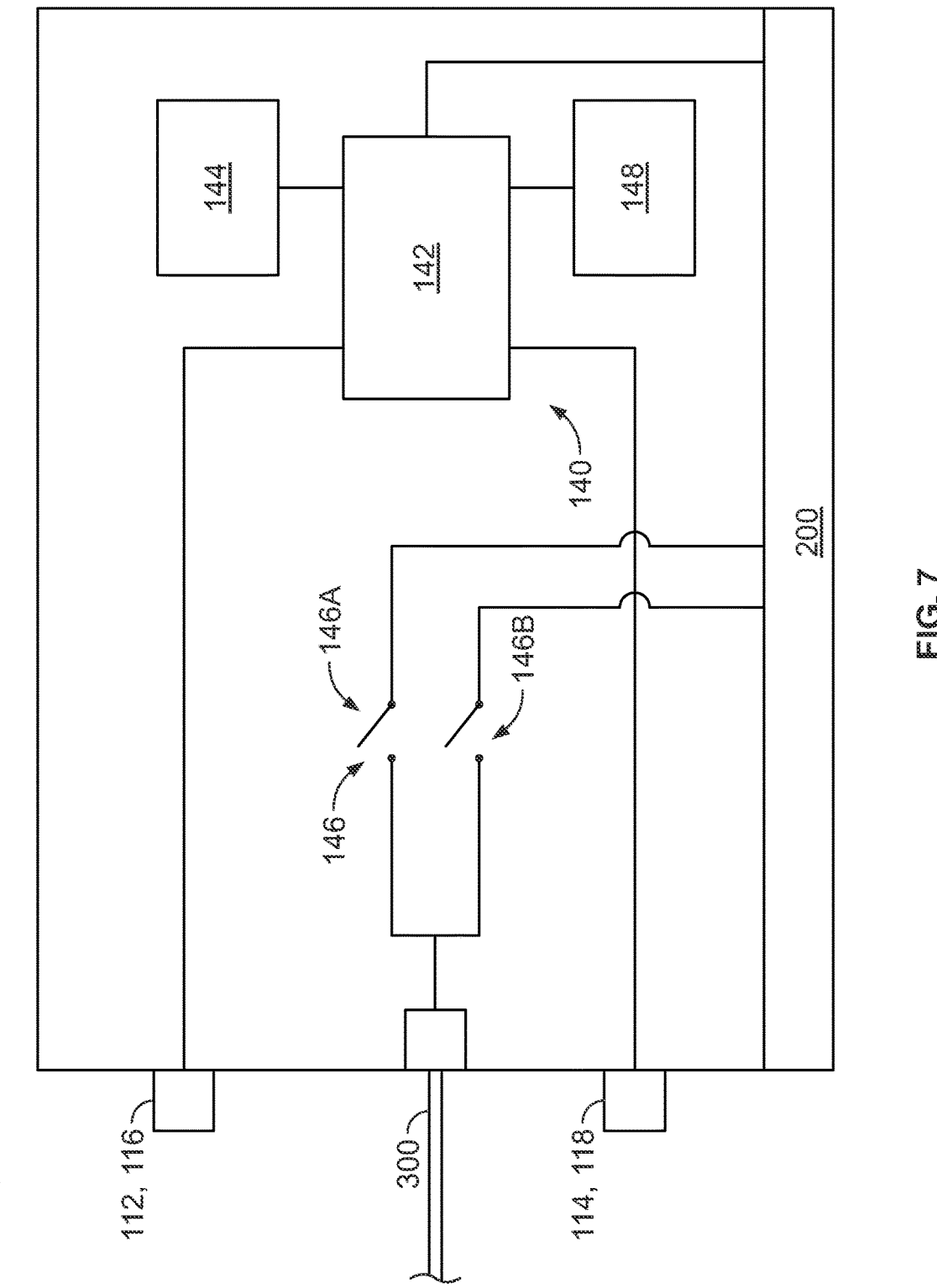
FIG. 7 is a schematic block diagram of the controller of FIG. 2.

FIG. 7 is a schematic diagram of the controller 100 according to some embodiments. The controller 100 includes an electronic circuit 140 including a processor 142. The controller 100 includes a wireless module 144 such as a receiver or transceiver configured to receive a wireless signal from the portable electronic device 400 (FIG. 1A). In some embodiments, the wireless module 144 is a Bluetooth module configured to pair with the portable electronic device 400 and receive Bluetooth signals therefrom.

The processor 142 is configured to, responsive to receiving an input signal, direct an ignition current to flow from the battery 200 to the cable 300. The input signal may be provided by an operator actuating an actuator on the controller (e.g., the first button 112). Alternatively, the input signal may be provided wirelessly by the portable electronic device 400 (FIG. 1A). Examples of these operations will be described in more detail below.

The electronic circuit 140 may include at least one switch 146. In some embodiments, first and second switches 146A, 146B are provided in parallel. This arrangement may allow for continued operation of the controller 100 in the event one of the switches fails. In some embodiments, the switches 146A, 146B are or include MOSFETs.

The processor 142 may direct the switch(es) 146 to close in response to receiving the input signal. This closes the circuit between the battery 200 and the cable 300 and allows for an ignition current to flow from the battery 200 to the cable 300. Assuming the cable 300 is properly connected to the mold 10 (FIG. 1A), the ignition current ignites the weld material 22 in the mold 10 (FIG. 1A).

The processor 142 may direct the ignition current for only a predetermined amount of time sufficient to ignite the weld material. In some embodiments, the predetermined amount of time is 500 ms. This minimizes the impact on certain components of the electronic circuit 140 (e.g., the switch(es) 146). In some embodiments, the processor 142 directs the switch(es) 146 to open after the predetermined amount of time.

The electronic circuit 140 may further include an alarm such as a speaker 148. The electronic circuit 140 may be in or on the PCB 108 (FIG. 2).

Figure 8:
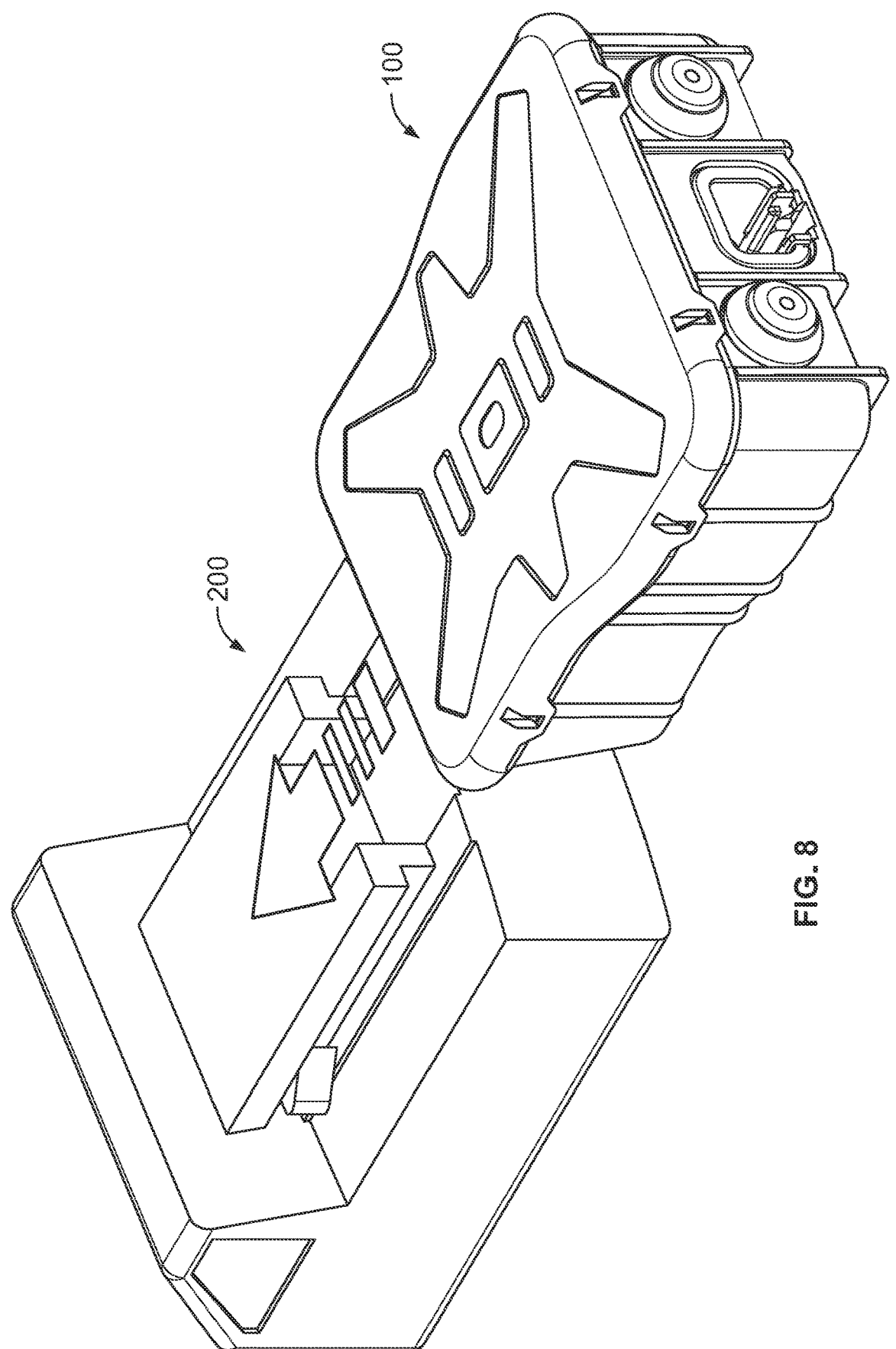
FIG. 8 illustrates the controller of FIG. 2 connecting to a battery.

Use of the controller according to example embodiments will now be described. The controller 100 may first be connected to battery 200 as shown in FIG. 8. The battery 200 may include a connection feature such as a rail and the controller 100 may include a corresponding connection feature such as a slot or groove (e.g., in the underside of the enclosure 102). The connection features may guide the controller 100 such that corresponding connections or terminals of the controller 100 and the battery 200 are electrically connected.

With the controller connected to the battery 200, the second button 114 (FIG. 3) (also referred to herein as the power switch) may be pressed to turn ON the controller 100. In some embodiments, when the controller 100 is ON, the LED 118 (e.g., a green LED) on the power switch 114 will illuminate.

The operator has the option to use a mobile application on the portable electronic device 400 to pair the electronic device 400 and the controller 100. In some embodiments, the operator may enter a unique pairing code printed or otherwise displayed on the controller 100 to complete the pairing process. In other embodiments, the operator scans the QR code on the controller to complete the pairing process.

In some embodiments, the controller 100 only allows the pairing of one portable electronic device at a time. For example, if the portable electronic device 400 is a first portable electronic device and is paired with the controller 100, the controller 100 may prevent a second portable electronic device from pairing with the controller 100.

In some embodiments, the controller 100 will unpair the portable electronic device 400 after a predetermined period of time with the controller 100 being idle. For example, the controller 100 may unpair the portable electronic device 400 after a predetermined period of time without a "firing" (welding operation) being performed. In some embodiments, the predetermined period of time is 30 minutes.

To prepare for a weld, the operator secures the conductors 26 and 28 to be joined in the mold 10 (FIG. 1A). The operator then connects the cable 300 to the controller 100. Specifically, referring to FIGS. 1-5, the first connector 308 of the cable 300 is connected to the connection 110 of the controller 100. The second connector 310 of the cable 300 is connected to igniter 41 to make connection 30 to the mold 10.

The weld operation may be carried out manually or remotely through a Bluetooth device such as the portable electronic device 400. For the manual weld operation, the operator may actuate the second button 114 (or power switch) to turn ON the controller 100. When the controller 100 is on, the second LED 118 (e.g., green LED) may illuminate.

In some embodiments, the operator may actuate the second button 114 again to enable an ARM mode. This may ensure that the controller 100 is ready to fire. In the ARM mode, the controller 100 may produce an audible alert (e.g., a buzzer sound using the speaker 148 shown in FIG. 7). In addition, in the ARM mode, the first LED 116 on the first button 112 (or fire switch) may illuminate (e.g., as a red LED).

The operator may press the fire switch 112 and continue to hold while the weld material 22 is ignited (e.g., hold up to about 5 seconds). The controller 100 may then automatically turn OFF. When the controller is OFF, the LEDs 116, 118 may turn off and the buzzer may stop.

Figure 9:
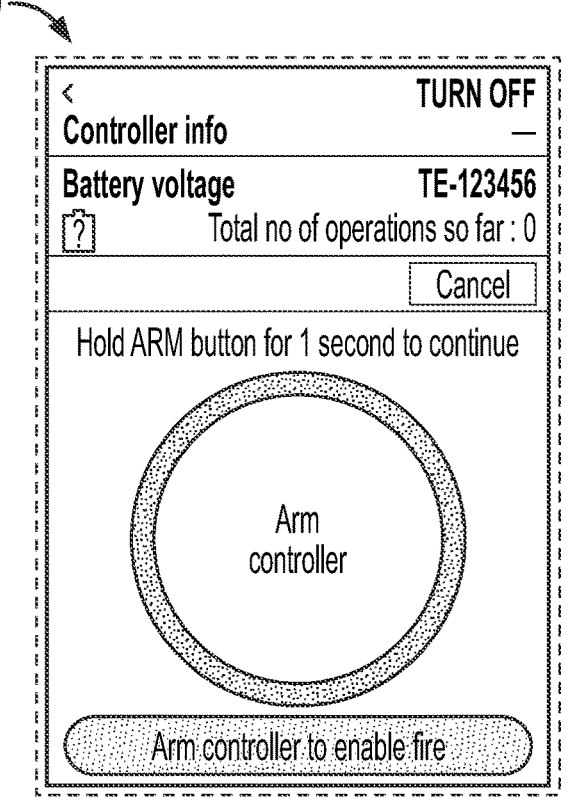
FIGS. 9 and 10 are example screenshots from a portable electronic device during a weld operation.

For a remote weld operation, the mold 10 is prepared and the cable 300 is connected between the mold 10 and the controller 100 as described above. The controller 100 is turned ON also as described above. The operator opens a mobile application associated with the controller 100 on the portable electronic device 400. The controller 100 is paired with the portable electronic device 400 (e.g., by scanning the QR code and/or entering the pair code). After successful pairing, the application may show the controller information screen, such as shown in FIG. 9. On the controller information screen, the operator may hold the "Arm Controller" button for a time (e.g., one second) and release to set the controller 100 ready to fire (ARM mode). When the controller 100 is ready to fire, the fire switch LED 116 should illuminate (e.g., red LED) and the speaker 148 may emit the buzzer sound.

Figure 10:
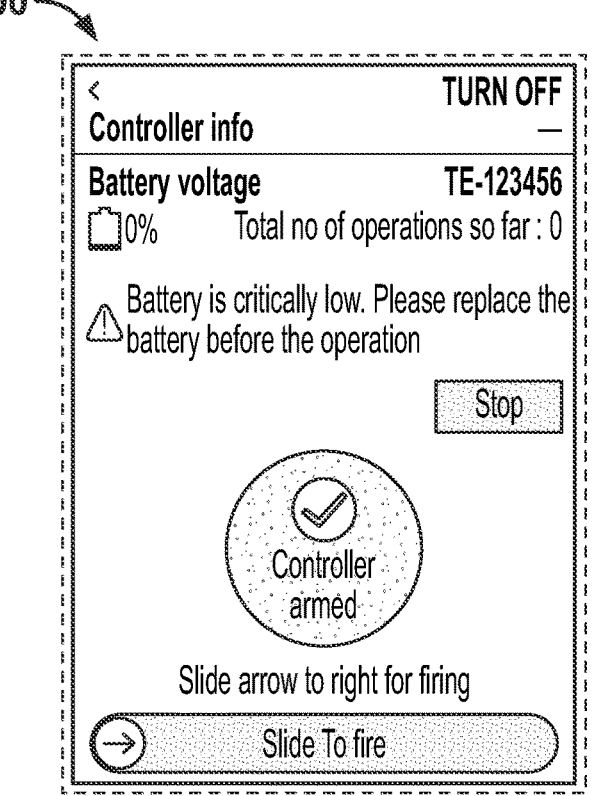

The application on the portable electronic device 400 may present a screen such as that shown in FIG. 10. The operator may slide the "Slide to Fire" button to provide the input signal to the controller 100 and initiate the ignition current. After successful completion of the fire, the fire switch LED 116 and the buzzer may turn off, but the power switch LED 118 may be on. A "Fire Completed" notification may pop up in the application.

There may be mobile applications for the welding operation available for a variety of operating systems (e.g., IOS and Android).

In some embodiments, the controller 100 and/or the portable electronic device 400 determines a distance between the portable electronic device 400 and the controller 100. The controller 100 may fire (e.g., send the ignition current from the battery to the cable second end) only if the distance is equal to or greater than a predetermined distance. In some embodiments, the predetermined distance is 1 meter. This may help ensure that the operator is at a safe distance from the mold 10 and the weld operation.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

We claim:

1. A method of controlling the ignition of exothermic weld material, the method comprising:

providing an exothermic welding system comprising: a controller including or connected to a battery; and a cable comprising a first end connected to a controller and a second, opposite end connected to an igniter, with a wire filament, attached to a mold holding the weld material;

receiving a wireless input signal from a portable electronic device; and in response to receiving the input signal, directing current from the battery to the second end of the cable to ignite the weld material, the method further comprising determining a distance between the controller and the portable electronic device, wherein directing current from the battery to the second end of the cable comprises directing current from the battery to the second end of the cable only if the distance is equal to or greater than a predetermined distance.

2. The method of claim 1 further comprising pairing the portable electronic device and the controller.

3. The method of claim 2 wherein the portable electronic device is a first portable electronic device, the method further comprising preventing a second portable electronic device from pairing with the controller while the first electronic device and the controller are paired.

4. The method of claim 2 further comprising unpairing the portable electronic device and the controller after a predetermined amount of time has elapsed with the controller being idle.

5. The method of claim 2 wherein pairing the portable electronic device and the controller comprises scanning a quick response (QR) code on the controller using the portable electronic device.

6. The method of claim 2 wherein pairing the portable electronic device and the controller comprises inputting a pair code using the portable electronic device.

7. The method of claim 1 further comprising displaying a warning or emitting an alert when the cable is not properly connected to the controller or to the mold.

8. The method of claim 1 further comprising, before receiving a wireless input signal from a portable electronic device, placing the controller in an ARM mode using the portable electronic device.

9. The method of claim 8 further comprising providing audible or visual feedback in response to the controller being in ARM mode.

10. The method of claim 1 wherein directing current from the battery to the second end of the cable comprises directing current from the battery to the second end of the cable for only a predetermined amount of time.

11. A controller for igniting weld material in an exothermic welding process, the controller comprising:
    an enclosure;
    a battery connection feature on the enclosure configured to connect the controller to a battery;
    an electronic circuit in the enclosure; and
    a connection on the enclosure and configured to receive a first end of a cable with a second, opposite end of the cable configured to be received at a mold holding the weld material,
    wherein the electronic circuit comprises a processor that is configured to, responsive to receiving an input signal, direct an ignition current to flow from the battery to the second end of the cable,
    wherein the electronic circuit comprises a wireless module configured to receive a wireless signal from a portable electronic device as the input signal,
    wherein the electronic circuit is configured to display a warning or emit an alert when the cable is not properly connected to the controller or the mold,
    wherein the electronic circuit is configured to determine a distance between the controller and the portable electronic device, and wherein the processor is configured to direct current from the battery to the second end of the cable only if the distance is equal to or greater than a predetermined distance.

12. The controller of claim 11 further comprising at least one actuator on the enclosure configured to provide the input signal upon actuation thereof.

13. The controller of claim 11 wherein the electronic circuit comprises at least one switch between the battery and the connection, and wherein the processor is configured to close the at least one switch in response to receiving the input signal.

14. The controller of claim 13 wherein the at least one switch comprises first and second switches arranged in parallel.

15. The controller of claim 11 wherein the enclosure comprises a primary body and a lid connected to the primary body with a seal therebetween.

16. The controller of claim 15 further comprising a connection seal around the connection.

17. The controller of claim 16 wherein the controller is an IP 65 enclosure.

18. An exothermic welding system comprising:
    a battery;
    a controller configured to electrically connect to the battery; and
    a cable comprising a first end configured to connect to a connection of the controller and a second end configured to connect to an igniter, with a wire filament, attached to a mold containing weld material,
    wherein the controller is configured to, in response to receiving an input signal, direct ignition current from the battery to the cable to ignite the weld material,
    wherein the input signal is selectively provided (i) as a wireless signal from a portable electronic device or (ii) in response to actuation of an actuator of the controller,
    wherein the controller is configured to display a warning or emit an alert when the cable is not properly connected to the controller or the mold,
    wherein the input signal is provided as a wireless signal from a portable electronic device,
    wherein the controller is configured to determine a distance between the controller and the portable electronic device, and
    wherein the controller is configured to direct current from the battery to the second end of the cable only if the distance is equal to or greater than a predetermined distance.

* * * * *